(12) United States Patent
Matsubara et al.

(10) Patent No.: US 7,041,019 B2
(45) Date of Patent: May 9, 2006

(54) AUTOMOTIVE COMPRESSOR HAVING A SIMPLE WATERPROOF STRUCTURE FOR A BEARING SUPPORTING A PULLEY

(75) Inventors: Tomohiko Matsubara, Isesaki (JP); Atsushi Ozawa, Isesaki (JP)

(73) Assignee: Sanden Corporation, Gunma (JP)

( * ) Notice: Subject to any disclaimer, the term of this patent is extended or adjusted under 35 U.S.C. 154(b) by 76 days.

(21) Appl. No.: 10/386,448

(22) Filed: Mar. 13, 2003

(65) Prior Publication Data

US 2003/0175134 A1 Sep. 18, 2003

(30) Foreign Application Priority Data

Mar. 15, 2002 (JP) .............................. 2002-071570

(51) Int. Cl.
F16H 35/10 (2006.01)
F16H 63/00 (2006.01)
F16H 7/20 (2006.01)

(52) U.S. Cl. ........................................ 474/70; 474/199

(58) Field of Classification Search .................. 474/70, 474/199; 192/84.1, 84.961, 110 B; 417/222.2, 417/3, 310, 269, 319; 418/180, 189, 191, 418/200.1, 206.5; 29/513, 606; 92/154.71
See application file for complete search history.

(56) References Cited

U.S. PATENT DOCUMENTS

| | | | | |
|---|---|---|---|---|
| 1,823,129 A | * | 9/1931 | Smith, et al. ............ 192/105 R |
| 4,943,213 A | * | 7/1990 | Forster et al. ............... 417/310 |
| 4,951,794 A | * | 8/1990 | Matsushita ............. 192/84.961 |
| 4,979,877 A | * | 12/1990 | Shimizu ................... 417/222.2 |
| 5,165,882 A | | 11/1992 | Shimizu et al. |
| 5,392,889 A | * | 2/1995 | Koitabashi ............. 192/84.961 |
| 5,644,970 A | * | 7/1997 | Michiyuki et al. .............. 92/71 |
| 5,941,693 A | * | 8/1999 | Kato ........................... 417/269 |
| 6,142,759 A | * | 11/2000 | Tateno et al. ............ 418/206.5 |
| 6,283,722 B1 | * | 9/2001 | Takenaka et al. ......... 417/222.2 |
| 6,385,988 B1 | * | 5/2002 | Ito .............................. 417/319 |

FOREIGN PATENT DOCUMENTS

| | | | | | |
|---|---|---|---|---|---|
| JP | (59-97729 A | * | 6/1984 | | |
| JP | (60-18235 A | * | 1/1985 | .................. | 29/513 |
| JP | (08-19405 A | * | 1/1996 | | |
| JP | (09-261906 A | * | 10/1997 | | |
| JP | (11-83293 A | * | 3/1999 | | |
| JP | 074119 | | 3/2001 | | |

* cited by examiner

*Primary Examiner*—Marcus Charles
(74) *Attorney, Agent, or Firm*—Baker Botts L.L.P.

(57) ABSTRACT

In an automotive compressor, a pulley (6) is rotatably supported on a compressor housing (1) through a bearing (5) to have an axial gap (10) left between the compressor housing and the pulley. A waterproof cover (13) covers the axial gap and serves to suppress water from the outside from reaching the bearing. The waterproof cover is fixed to the compressor housing by a ring-shaped fastener (14). Instead of use of the waterproof cover, the axial gap may be controlled in size thereof.

27 Claims, 6 Drawing Sheets

AUTOMOTIVE COMPRESSOR HAVING A SIMPLE WATERPROOF STRUCTURE FOR A BEARING SUPPORTING A PULLEY

CROSS REFERENCE TO RELATED APPLICATIONS

This application claims priority to Japanese Patent Application No. 2002-071570, filed Mar. 15, 2002, the disclosure of which is incorporated herein by reference.

BACKGROUND OF THE INVENTION

This invention relates to an automotive compressor and, in particular, to a waterproof structure for a bearing through which a pulley is rotatably supported on a compressor housing.

For example, Japanese Unexamined Patent Publication No. 2001-74119 discloses a compressor in a refrigerating cycle. In the compressor, a pulley is rotatably supported through a bearing on a compressor housing. When the pulley is rotated by an external drive source, a compression element in the compressor housing are driven through a power transmission system including a shaft. The power transmission system has a torque limiter mechanism. The torque limiter mechanism serves to interrupt transmission of rotary power from the pulley to the compression element during overload, for example, due to locking of the shaft or the compression element.

In the compressor of the type, variable displacement by external control is achieved. Therefore, it is unnecessary to use an electromagnetic clutch for connecting and disconnecting the rotary power of the pulley to and from the shaft. However, in an existing compressor with the electromagnetic clutch, the bearing is prevented from being wet with water by a field core of the electromagnetic clutch. If the electromagnetic clutch is not used, it is impossible to prevent the bearing from being wet with water. As a result, the compressor is lowered in durability and shortened in machine life.

In the Japanese Unexamined Patent Publication No. 2001-74119 mentioned above, the compressor is provided with a waterproof cover for suppressing water from the outside from reaching the bearing rotatably supporting the pulley. The waterproof cover is fastened and fixed to the compressor housing by a plurality of screws.

However, use of a plurality of screws to fix the waterproof cover results in an increase in number of parts and in complexity in fixing operation.

SUMMARY OF THE INVENTION

It is therefore an object of the present invention to provide an automotive compressor in which a waterproof structure for a bearing rotatably supporting a pulley is implemented with a small number of parts and by a simple operation.

Other objects of the present invention will become clear as the description proceeds.

According to a first aspect of the present invention, there is provided an automotive compressor which comprises a compressor housing, a pulley mounted on the compressor housing to have an axial gap left between the compressor housing and the pulley, a bearing interposed between the compressor housing and the pulley and rotatably supporting the pulley, a waterproof cover covering the axial gap to suppress water from the outside from reaching the bearing, and a ring-shaped fastener fixing the waterproof cover to the compressor housing.

According to a second aspect of the present invention, there is provided an automotive compressor which comprises a compressor housing, a pulley mounted on the compressor housing to have an axial gap left between the compressor housing and the pulley, a bearing interposed between the compressor housing and the pulley and rotatably supporting the pulley, and a waterproof cover covering the axial gap to suppress water from the outside from reaching the bearing, the water proof cover being fixed to the compressor housing by the use of a part of the bearing.

According to a third aspect of the present invention, there is provided an automotive compressor which comprises a compressor housing having a radial surface radially extending and a protrusion protruded from the radial surface, a pulley mounted on the compressor housing to have an axial gap left between the compressor housing and the pulley, a bearing interposed between the compressor housing and the pulley and rotatably supporting the pulley, and a waterproof cover covering the axial gap to suppress water from the outside from reaching the bearing, the waterproof cover being fixed to the compressor housing by the use of the protrusion.

According to a fourth aspect of the present invention, there is provided an automotive compressor which comprises a compressor housing having a cylindrical portion axially extending and a groove at a peripheral surface of the cylindrical portion, a pulley mounted on the cylindrical portion to have an axial gap left between the compressor housing and the pulley, a bearing interposed between the compressor housing and the pulley and rotatably supporting the pulley, and a waterproof cover covering the axial gap to suppress water from the outside from reaching the bearing, the waterproof cover being fixed to the cylindrical portion by being engaged with the groove.

According to a fifth aspect of the present invention, there is provided an automotive compressor which comprises a compressor housing, a pulley mounted on the compressor housing to have an axial gap left between the compressor housing and the pulley, a bearing interposed between the compressor housing and the pulley and rotatably supporting the pulley, and a waterproof cover covering the axial gap to suppress water from the outside from reaching the bearing, the waterproof cover having a drain hole formed at its lower part.

According to a sixth aspect of the present invention, there is provided an automotive compressor which comprises a compressor housing, a pulley mounted on the compressor housing to have an axial gap left between the compressor housing and the pulley, a bearing interposed between the compressor housing and the pulley and rotatably supporting the pulley, and a seal member having a part placed at the axial gap to suppress water from the outside from reaching the bearing.

According to a seventh aspect of the present invention, there is provided an automotive compressor which comprises a compressor housing, a pulley mounted on the compressor housing to have an axial gap left between the compressor housing and the pulley, a bearing interposed between the compressor housing and the pulley and rotatably supporting the pulley, and a protrusion formed on one of the compressor housing and the pulley to substantially narrow the axial gap and suppressing water from the outside from reaching the bearing.

According to an eighth aspect of the present invention, there is provided an automotive compressor which comprises a compressor housing, a pulley mounted on the compressor housing to have an axial gap left between the compressor housing and the pulley, a bearing interposed between the compressor housing and the pulley and rotatably supporting the pulley, and an additional member added to one of the compressor housing and the pulley to substantially narrow the axial gap and suppressing water from the outside from reaching the bearing.

DESCRIPTION OF THE PREFERRED EMBODIMENTS

Figure 1:
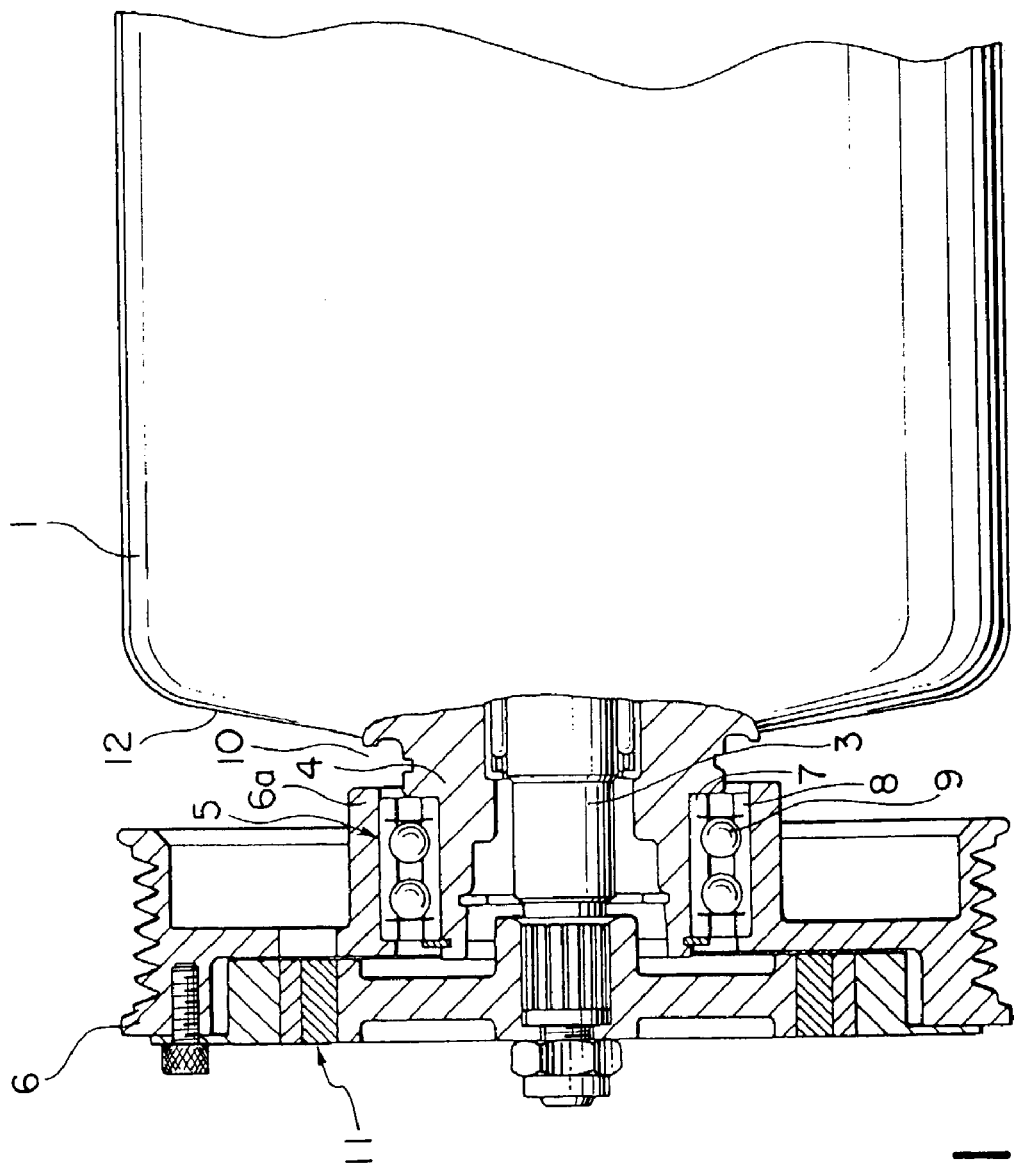
FIG. 1 is a vertical sectional view schematically showing a characteristic part of an automotive compressor to which the present invention is applicable.

Referring to FIG. 1, description will be made of an automotive compressor to which the present invention is applicable.

The compressor illustrated in the figure includes a compressor housing 1. The compressor housing 1 includes a compression element (not shown) arranged therein. A shaft 3 connected to the compression element inside the compressor housing 1 is led out through an interior of a cylindrical portion 4 integrally coupled to one end of the compressor housing 1. The cylindrical portion 4 has an outer peripheral surface on which a pulley 6 is rotatably supported through a ball bearing 5. The bearing 5 comprises an inner race 7 fixed to the outer peripheral surface of the cylindrical portion 4, an outer race 8 fixed to an inner surface of a cylindrical hub 6a of the pulley 6, and a number of balls 9 interposed between the inner race 7 and the outer race 8 to be rollable. The pulley 6 is connected to the shaft 3 through a torque limiter mechanism 11 and other components.

When the pulley 6 is rotated by an external drive source, rotary power of the pulley 6 is transmitted to the shaft 3 through the torque limiter mechanism 11 and other components. When the shaft 3 is rotated, the compression element inside the compressor housing 1 provides a compressing action of compressing, for example, a refrigerant. Therefore, the compressor can be used in a refrigerating cycle.

When subjected to overload due to locking of the shaft 3 or the compression element, the torque limiter mechanism 11 interrupts transmission of the rotary power from the pulley 6 to the compression element. It is noted here that the compressor may be an external control variable displacement compressor.

In the compressor in which the pulley 6 is rotatably supported on the compressor housing 1 through the bearing 5, water may possibly leak from the outside through an axial gap 10 left between an outer surface 12 of the compressor housing 1 and the pulley 6. Therefore, if the compressor is mounted to an automobile, it is desired to provide a waterproof structure for suppressing the water from reaching the bearing 5.

Hereinafter, description will be made of automotive compressors according to several preferred embodiments of the present invention. In the preferred embodiments, similar parts or portions are designated by like reference numerals.

Figure 2:
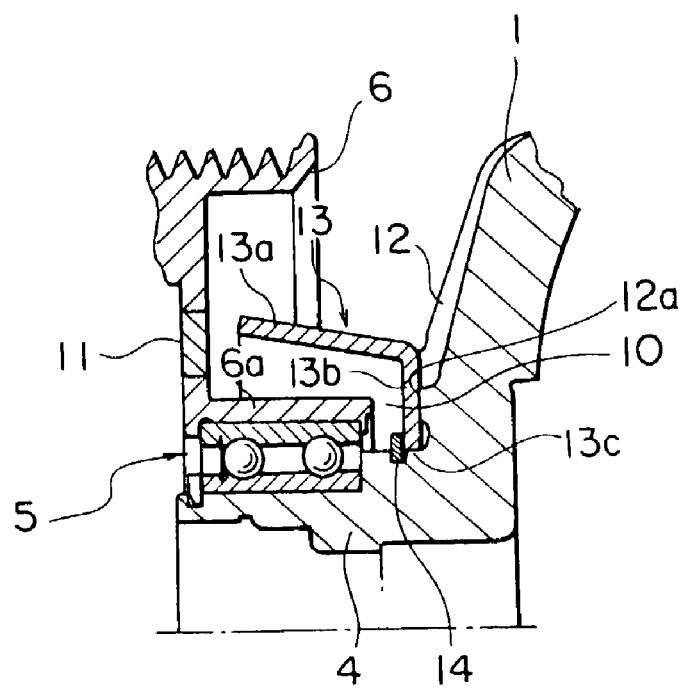
FIG. 2 is a sectional view of a characteristic part of an automotive compressor according to a first embodiment of the present invention.

Referring to FIG. 2, an automotive compressor according to a first embodiment of the present invention comprises a waterproof cover 13 for suppressing water from the outside from reaching the bearing 5. The waterproof cover 13 has a guide portion 13a having a frustoconical cylindrical shape, and a ring-shaped fixing portion 13b integrally coupled to a small-diameter end of the guide portion 13a. The fixing portion 13b is provided with a through hole 13c to be fitted to the cylindrical portion 4 of the compressor housing 1.

In order to fix the waterproof cover 13, the through hole 13c is fitted to the cylindrical portion 4 and the fixing portion 13b is put in contact with a radial surface 12a of the outer surface 12 of the compressor housing 1. Then, a ring-shaped fastener 14 comprising a snap ring or a fastening ring is fitted to a ring-shaped groove 13b made on an outer peripheral surface 13a of the cylindrical portion 4. As a consequence, the waterproof cover 13 is fixed to the compressor housing 1 by the radial surface 12a and the ring-shaped fastener 14 and prevented from being released. A snap ring, which has been used to fix a field core of an electromagnetic clutch to the compressor housing 1, may be used as the ring-shaped fastener 14. As described above, the electromagnetic clutch has traditionally been used to connect and disconnect the rotary power of the pulley 6 to and from the shaft 3.

Even if water leaks from the outside through the gap between the outer surface 12 of the compressor housing 1 and the pulley 6, the water is guided by the guide portion 13a of the waterproof cover 13 to be collected on the outer surface 12 of the compressor housing 1 and discharged downward without reaching the bearing 5. Therefore, it is possible to inhibit or suppress the bearing 5 from being wet with water.

With the structure in FIG. 2, the waterproof cover 13 is fixed to the compressor housing 1 by the single ring-shaped fastener 14. Therefore, the number of parts is reduced and the fixing operation is facilitated.

Figure 3:
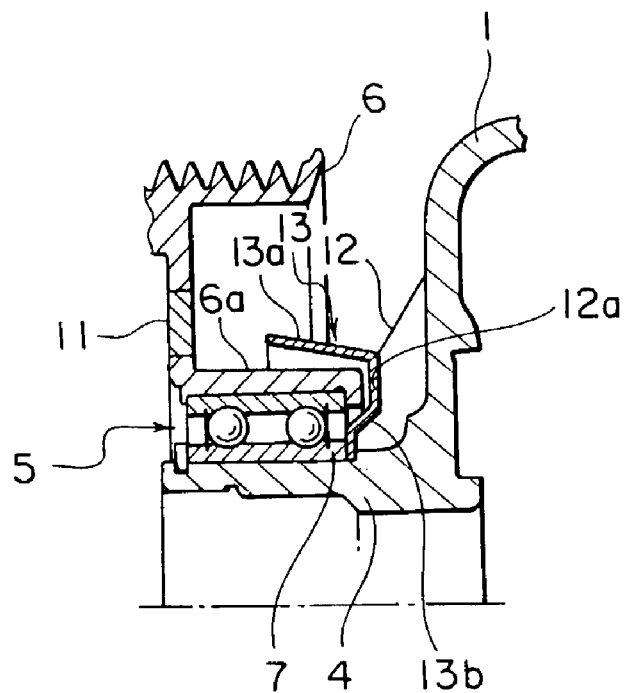
FIG. 3 is a sectional view of a characteristic part of an automotive compressor according to a second embodiment of the present invention.

Referring to FIG. 3, a part of an automotive compressor according to a second embodiment of the present invention is shown. The fixing portion 13b is interposed between the outer surface 12 of the compressor housing 1 and the inner race 7 of the bearing 5. Thus, the waterproof cover 13 is fixed to the compressor housing 1.

With the structure in FIG. 3, no special part is required to fix the waterproof cover 13. Therefore, the number of parts is reduced and the fixing operation is facilitated.

Figure 4:
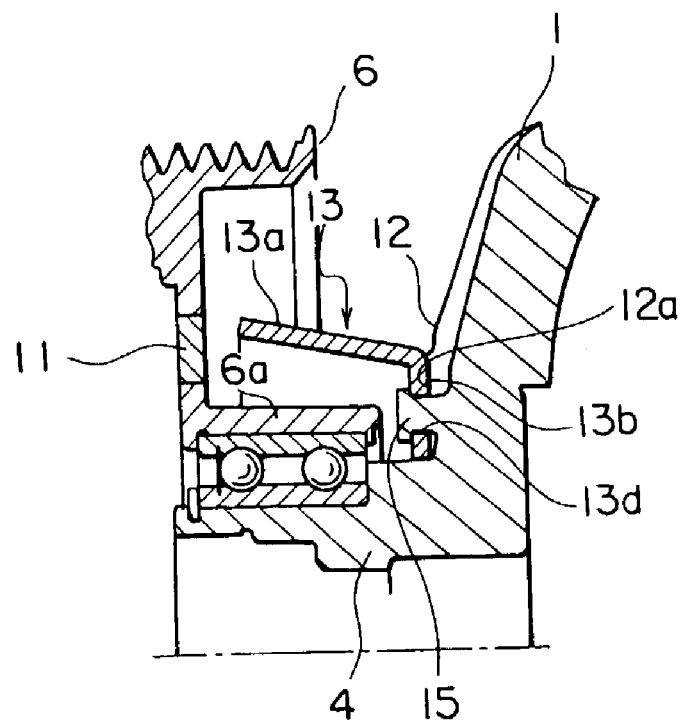
FIG. 4 is a sectional view of a characteristic part of an automotive compressor according to a third embodiment of the present invention.

Referring to FIG. 4, a part of an automotive compressor according to a third embodiment of the present invention is shown. The compressor housing 1 has a plurality of protrusions 15 formed at a plurality of positions on the radial surface 12a of the outer surface 12 thereof. On the other hand, the fixing portion 13b of the waterproof cover 13 is provided with a plurality of small holes 13d in one-to-one correspondence to the protrusions 15.

In order to fix the waterproof cover 13, the protrusions 15 are fitted to the small holes 13d of the waterproof cover 13. Then, ends of the protrusions 15 are staked or caulked. As a consequence, the waterproof cover 13 is fixed to the compressor housing 1.

With the structure in FIG. 4, no special part is required to fix the waterproof cover 13. Therefore, the number of parts is reduced and the fixing operation is facilitated.

Figures 5A, 5B:
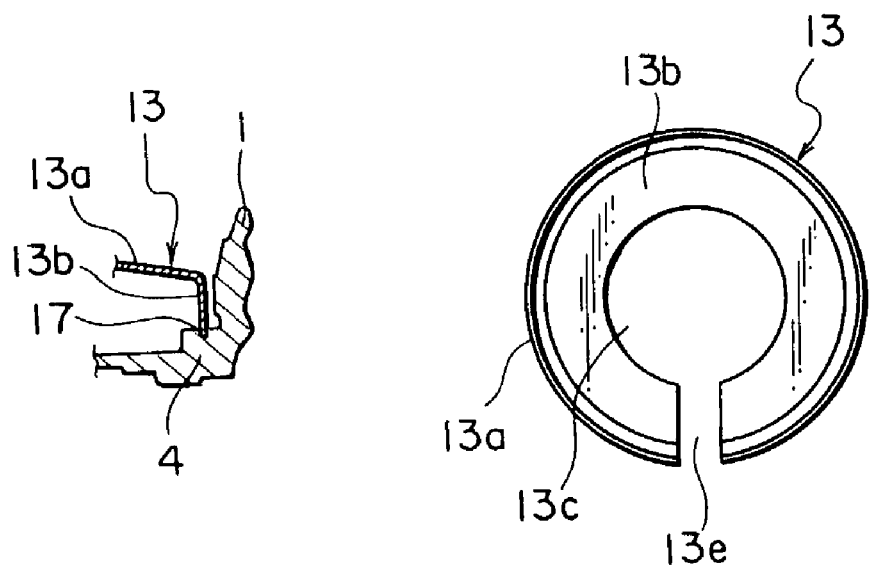
FIG. 5A is a sectional view of a characteristic part of an automotive compressor according to a fourth embodiment of the present invention.
FIG. 5B is a front view of a waterproof cover used in the automotive compressor illustrated in FIG. 5A.

Referring to FIGS. 5A and 5B, an automotive compressor according to a fourth embodiment of the present invention will be described. The compressor housing 1 is provided with a ring-shaped groove 17 formed in an outer peripheral surface of the cylindrical portion 4. On the other hand, the waterproof cover 13 has a cutout portion 13e extending from the through hole 13c to an outer peripheral end of the waterproof cover 13.

In order to fix the waterproof cover 13, the cutout portion 13e is elastically widened and the waterproof cover 13 is fitted to the cylindrical portion 4. By restoration of the waterproof cover 13, the fixing portion 13b is engaged with the ring-shaped groove 17. As a consequence, the waterproof cover 13 is fixed to the compressor housing 1.

With the structure in FIGS. 5A and 5B, no special part is required to fix the waterproof cover 13. Therefore, the number of parts is reduced and the fixing operation is facilitated.

Figure 6A:
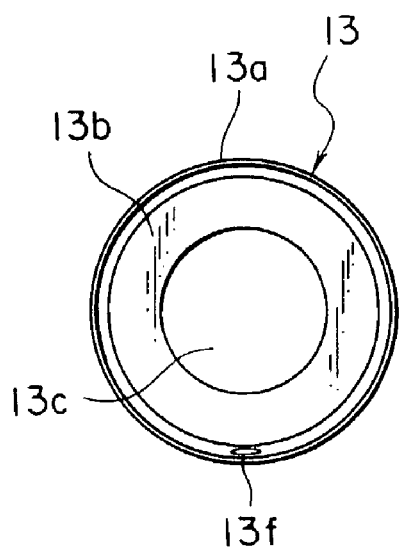
FIG. 6A is a front view of a modification of the waterproof cover which can be used in each of the automotive compressors illustrated in FIGS. 2 through 5A.
Figure 6B:
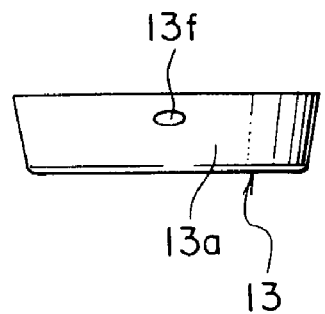
FIG. 6B is a bottom view of the waterproof cover illustrated in FIG. 6A.

Referring to FIGS. 6A and 6B, each of the waterproof covers 13 used in FIGS. 2 through FIGS. 5A and 5B may preferably be modified in the manner such that a drain hole 13f is formed at a lower part of the guide portion 13a.

Figure 7:
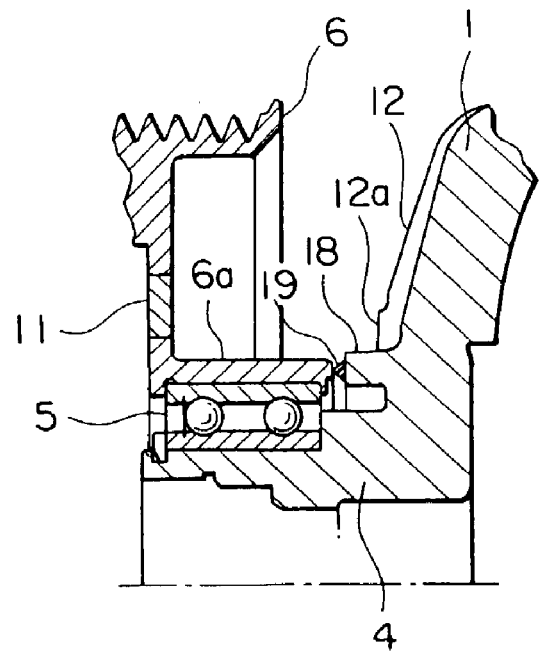
FIG. 7 is a sectional view of a characteristic part of an automotive compressor according to a fifth embodiment of the present invention.

Referring to FIG. 7, a part of an automotive compressor according to a fifth embodiment of the present invention is shown. The compressor housing 1 has a cylindrical protrusion 18 formed on the radial surface 12a of the outer surface 12 thereof and protruding in an axial direction around the cylindrical portion 4 to approach an axial end face of the cylindrical hub 6a of the pulley 6. The cylindrical protrusion 18 has an end with a ring-shaped seal member 19 made of resin or rubber fixed thereto and kept in frictional contact with the axial end face of the cylindrical hub 6a of the pulley 6. The ring-shaped seal member 19 serves to suppress the water from the outside from reaching the bearing 5.

With the structure in FIG. 7, waterproofing of the bearing 5 can be achieved simply by the use of the ring-shaped seal member 19. Therefore, the number of parts is reduced and the fixing operation is facilitated. The seal member 19 may be fixed to the pulley 6 and kept in frictional contact with the cylindrical protrusion 18.

Figure 8:
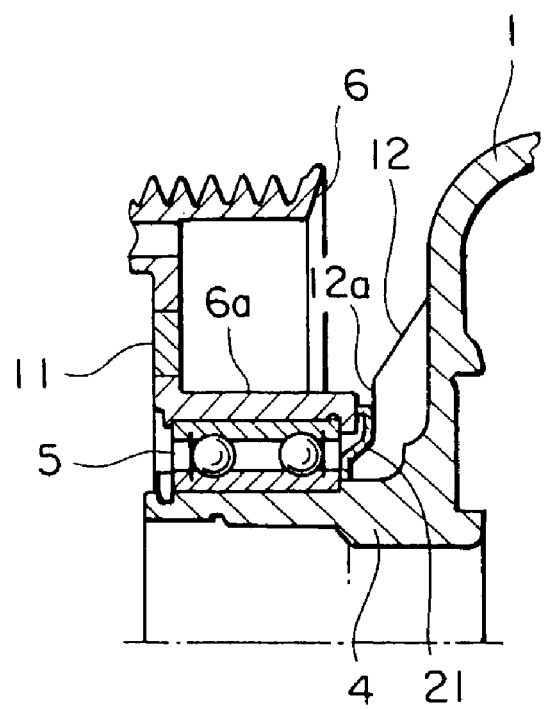
FIG. 8 is a sectional view of a characteristic part of an automotive compressor according to a sixth embodiment of the present invention.

Referring to FIG. 8, a part of an automotive compressor according to a sixth embodiment of the present invention is shown. The compressor housing 1 is provided with a ring-plate seal member 21 made of resin or rubber fixed to the outer surface 12 thereof. The seal member 21 is put in contact with the radial surface 12a and fixed by the use of the bearing 5. The seal member 21 has an outer peripheral end kept in frictional contact with the axial end face of the cylindrical hub 6a of the pulley 6. The ring-plate seal member 21 serves to suppress the water from the outside from reaching the bearing 5.

With the structure in FIG. 8, waterproofing of the bearing 5 can be achieved simply by the use of the ring-plate seal member 21. Therefore, the number of parts is reduced and the fixing operation is facilitated. The seal member 21 may be fixed to the pulley 6 and kept in frictional contact with the outer surface 12 of the compressor housing 1.

Figure 9:
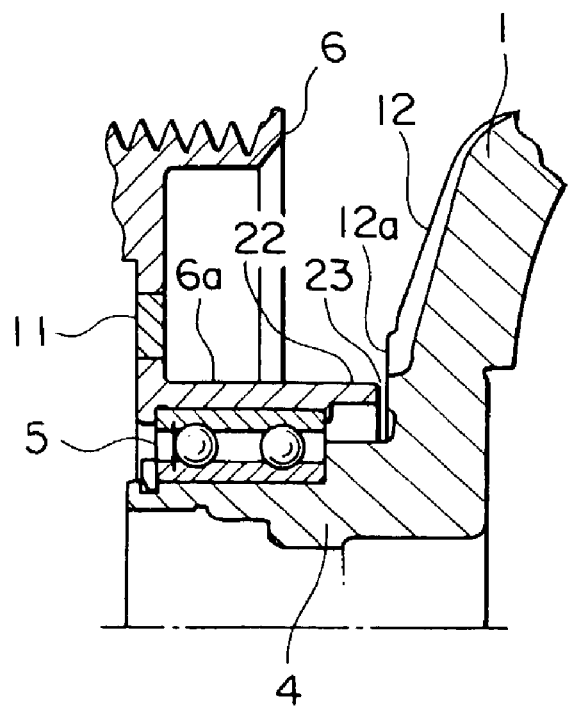
FIG. 9 is a sectional view of a characteristic part of an automotive compressor according to a seventh embodiment of the present invention.

Referring to FIG. 9, a part of an automotive compressor according to a seventh embodiment of the present invention is shown. The cylindrical hub 6a of the pulley 6 has a cylindrical protrusion 22 integrally formed therewith and closely adjacent to the radial surface 12a of the outer surface 12 of the compressor housing 1. An axial gap 23 between the compressor housing 1 and the pulley 6 is designed to be small so that the water from the outside is suppressed from reaching the bearing 5.

With the structure in FIG. 9, no additional part is required. Therefore, the number of parts is reduced and the fixing operation is facilitated. In the modified embodiment, a portion corresponding to the cylindrical protrusion 22 may be formed on the outer surface 12 of the compressor housing 1.

Figure 10:
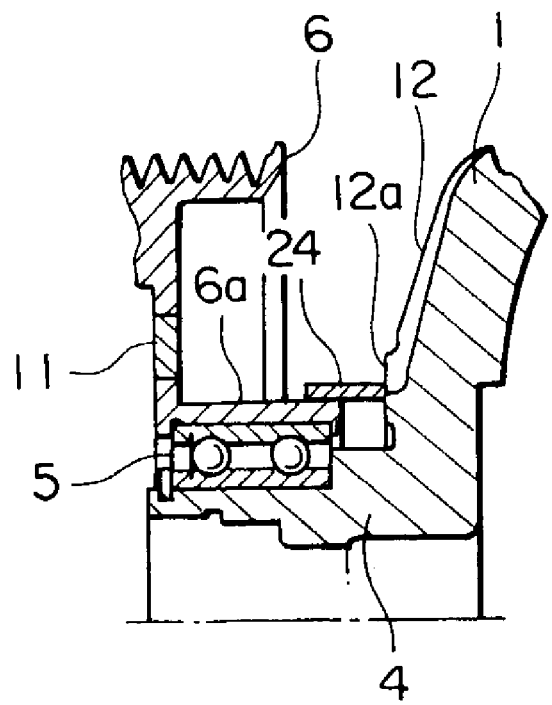
FIG. 10 is a sectional view of a characteristic part of an automotive compressor according to an eighth embodiment of the present invention.

Referring to FIG. 10, a part of an automotive compressor according to an eighth embodiment of the present invention is shown. A cylindrical additional member or part 24 is attached to the cylindrical hub 6a of the pulley 6. The cylindrical additional part 24 is closely adjacent to the radial surface 12a of the outer surface 12 of the compressor housing 1. Thus, the axial gap between the compressor housing 1 and the pulley 6 is designed to be small so that the water from the outside is suppressed from reaching the bearing 5.

With the structure in FIG. 10, the additional part 24 is simply attached to the pulley 6. Therefore, the number of parts is reduced and the fixing operation is facilitated.

Figure 11:
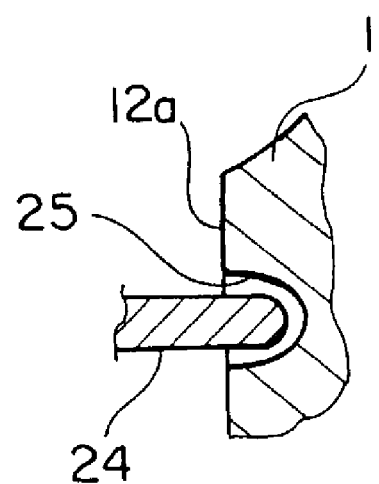
FIG. 11 is an enlarged sectional view of a characteristic part of a modification of the automotive compressor illustrated in FIG. 10.

Referring to FIG. 11, the radial surface 12a of the compressor housing 1 may be provided with a ring-shaped recess 25 so that an axial end of the additional part 24 is inserted into the ring-shaped recess 25 with a small gap. A portion corresponding to the additional part 24 may be formed on the radial surface 12a of the compressor housing 1.

While the present invention has thus far been described in connection with a few embodiments thereof, it will readily be possible for those skilled in the art to put this invention into practice in various other manners. For example, the above-mentioned embodiments may appropriately be combined.

What is claimed is:

1. An automotive compressor comprising:
    a compressor housing;
    a pulley mounted on said compressor housing and having an axial gap between said compressor housing and said pulley;
    a bearing interposed between said compressor housing and said pulley and rotatably supporting said pulley;
    a waterproof cover covering said axial gap to suppress water from the outside from reaching said bearing; and a ring-shaped fastener fixing said waterproof cover to said compressor housing, wherein said waterproof cover comprises:
a guide portion having a frustoconical cylindrical shape and covering said axial gap; and
a fixing portion extending inwardly from a small-diameter end of the guide portion and fixed to said compressor housing by said ring-shaped fastener.

2. The automotive compressor according to claim 1, wherein said compressor housing has a cylindrical portion, said pulley being mounted on said cylindrical portion through said bearing, said fixing portion being made of a ring-shape to have a through hole through which said cylindrical portion is inserted.

3. The automotive compressor according to claim 2, wherein said compressor housing has a radial surface extending outwardly and radially from said cylindrical portion, said fixing portion being put in contact with said radial surface.

4. The automotive compressor according to claim 3, wherein said cylindrical portion has a groove at an outer peripheral surface thereof, said ring-shaped fastener being engaged with said groove and fixing said fixing portion in cooperation with said radial surface.

5. The automotive compressor according to claim 1, wherein said ring-shaped fastener comprises a snap ring.

6. The automotive compressor according to claim 1, wherein said ring-shaped fastener comprises a fastening ring.

7. An automotive compressor comprising:
a compressor housing;
a pulley mounted on said compressor housing and having an axial gap between said compressor housing and said pulley;
a bearing interposed between said compressor housing and said pulley and rotatably supporting said pulley; and
a waterproof cover covering said axial gap to suppress water from the outside from reaching said bearing, said water proof cover being fixed to said compressor housing by the use of a part of said bearing; wherein said waterproof cover comprises:
a guide portion having a frustoconical cylindrical shape and covering said axial gap; and
a fixing portion extending inwardly from a small-diameter end of the guide portion and fixed to said compressor housing by the use of a part of said bearing.

8. The automotive compressor according to claim 7, wherein said compressor housing has a cylindrical portion, said pulley being mounted on said cylindrical portion through said bearing, said fixing portion being made of a ring-shape to have a through hole through which said cylindrical portion is inserted.

9. The automotive compressor according to claim 8, wherein said compressor housing has a radial surface extending outwardly and radially from said cylindrical portion, said fixing portion being put in contact with said radial surface.

10. An automotive compressor comprising:
a compressor housing having a radial surface radially extending and a protrusion protruded from said radial surface;
a pulley mounted on said compressor housing and having an axial gap between said compressor housing and said pulley;
a bearing interposed between said compressor housing and said pulley and rotatably supporting said pulley; and
a waterproof cover covering said axial gap to suppress water from the outside from reaching said bearing, said waterproof cover being fixed to said compressor housing by the use of said protrusion, wherein said waterproof cover comprises:
a guide portion having a frustoconical cylindrical shape and covering said axial gap; and
a fixing portion extending inwardly from a small-diameter end of the guide portion and fixed to said compressor housing by the use of said protrusion.

11. The automotive compressor according to claim 10, wherein said protrusion is subjected to staking.

12. The automotive compressor according to claim 10, wherein said protrusion is subjected to caulking.

13. The automotive compressor according to claim 10, wherein said compressor housing has a cylindrical portion extending axially from said radial surface, said pulley being mounted on said cylindrical portion through said bearing, said fixing portion being made of a ring-shape to have a through hole through which said cylindrical portion is inserted.

14. The automotive compressor according to claim 13, wherein said fixing portion is put in contact with said radial surface.

15. An automotive compressor comprising:
a compressor housing having a cylindrical portion axially extending and a groove at a peripheral surface of said cylindrical portion;
a pulley mounted on said cylindrical portion and having an axial gap between said compressor housing and said pulley, such that said pulley rotates independently from said cylindrical portion;
a bearing interposed between said compressor housing and said pulley and rotatably supporting said pulley; and
a waterproof cover covering said axial gap to suppress water from the outside from reaching said bearing, said waterproof cover being fixed to said cylindrical portion by being engaged with said groove.

16. The automotive compressor according to claim 15, wherein said waterproof cover comprises:
a guide portion having a frustoconical cylindrical shape and covering said axial gap; and
a fixing portion extending inwardly from a small-diameter end of the guide portion and engaged with said groove.

17. The automotive compressor according to claim 16, wherein said pulley is mounted on said cylindrical portion through said bearing, said fixing portion being made of a ring-shape to have a through hole through which said cylindrical portion is inserted.

18. The automotive compressor according to claim 16, wherein said groove extends along said peripheral surface of the cylindrical portion to make a ring shape.

19. An automotive compressor comprising:
a compressor housing;
a pulley mounted on said compressor housing to have an axial gap left between said compressor housing and said pulley;
a bearing interposed between said compressor housing and said pulley and rotatably supporting said pulley; and
a waterproof cover covering said axial gap to suppress water from the outside from reaching said bearing, said waterproof cover having a drain hole formed at its lower part; wherein said waterproof cover comprises:

a guide portion having a frustoconical cylindrical shape and covering said axial gap; and a fixing portion extending inwardly from a small-diameter end of the guide portion and fixed to said compressor housing by the use of a part of said bearing.

20. The automotive compressor according to claim 19, wherein said drain hole being formed in said guide portion.

21. An automotive compressor comprising:

a compressor housing;

a pulley mounted on said compressor housing and having an axial gap between said compressor housing and said pulley;

a bearing interposed between said compressor housing and said pulley and rotatably supporting said pulley; and a seal member having a part placed at said axial gap to suppress water from the outside from reaching said bearing, wherein said compressor housing has a cylindrical portion extending in an axial direction and a cylindrical protrusion around said cylindrical portion, said bearing surrounding said cylindrical portion, said pulley having a cylindrical hub which surrounds said bearing and faces said cylindrical protrusion in said axial direction to define said axial gap between said cylindrical protrusion and said hub, said seal member being fixed to one of said cylindrical protrusion and said hub.

22. The automotive compressor according to claim 21, wherein said seal member is kept in frictional contact with another of said cylindrical protrusion and said hub.

23. The automotive compressor according to claim 21, wherein said compressor housing has a radial surface radially extending, said pulley having a cylindrical hub which surrounds said bearing and faces said radial surface in an axial direction to define said axial gap between said radial surface and said hub, said seal member being put in contact with said radial surface and fixed by the use of said bearing.

24. The automotive compressor according to claim 23, wherein said seal member is kept in frictional contact with said hub.

25. An automotive compressor comprising:

a compressor housing;

a pulley mounted on said compressor housing and having an axial gap between said compressor housing and said pulley;

a bearing interposed between said compressor housing and said pulley and rotatably supporting said pulley; and a protrusion formed on one of said compressor housing and said pulley to substantially narrow said axial gap and suppressing water from the outside from reaching said bearing, wherein said compressor housing has a cylindrical portion extending in an axial direction and a radial surface extending radially and outwardly from said cylindrical portion, said bearing surrounding said cylindrical portion, said pulley having a cylindrical hub which surrounds said bearing said protrusion being cylindrical and protruded from said cylindrical hub towards said radial surface.

26. An automotive compressor comprising:

a compressor housing;

a pulley mounted on said compressor housing and having an axial gap between said compressor housing and said pulley;

a bearing interposed between said compressor housing and said pulley and rotatably supporting said pulley; and an additional member added to one of said compressor housing and said pulley to substantially narrow said axial gap and suppressing water from the outside from reaching said bearing, wherein said compressor housing has a cylindrical portion extending in an axial direction and a radial surface extending radially and outwardly from said cylindrical portion, said bearing surrounding said cylindrical portion, said pulley having a cylindrical hub which surrounds said bearing, said additional member being cylindrical and attached to said cylindrical hub.

27. The automotive compressor according to claim 26, wherein said radial surface has a ring-shaped recess, said additional member having an axial end inserted into said ring-shaped recess with a small gap therebetween.

* * * * *